(12) United States Patent
Mildh et al.

(10) Patent No.: US 10,778,399 B2
(45) Date of Patent: Sep. 15, 2020

(54) ENHANCEMENT OF RELAY ARQ IN MMW NETWORK

(71) Applicant: Telefonaktiebolaget LM Ericsson (publ), Stockholm (SE)

(72) Inventors: Gunnar Mildh, Sollentuna (SE); Rui Fan, Beijing (CN); Qianxi Lu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/077,625

(22) PCT Filed: Feb. 29, 2016

(86) PCT No.: PCT/SE2016/050156
§ 371 (c)(1),
(2) Date: Aug. 13, 2018

(87) PCT Pub. No.: WO2017/151022
PCT Pub. Date: Sep. 8, 2017

(65) Prior Publication Data
US 2019/0052438 A1   Feb. 14, 2019

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/0081* (2013.01); *H04L 1/1664* (2013.01);
(Continued)

(58) Field of Classification Search
CPC ... H04L 5/0055; H04L 1/0081; H04L 1/1664; H04L 1/1822; H04L 1/1896; H04L 45/72;
(Continued)

(56) References Cited

U.S. PATENT DOCUMENTS 6,301,479 B1 * 10/2001 Roobol ................ H04L 1/1835
455/410
8,031,691 B2 * 10/2011 Ngo ..................... H04L 1/1822
370/230

(Continued)

FOREIGN PATENT DOCUMENTS

GB    2478004 A    8/2011

OTHER PUBLICATIONS

Wiemann, Henning , et al., "A Novel Multi-Hop ARQ Concept", IEEE, Ericsson Research, Ericsson GmbH, Aachen, Germany, 2005, 5 pages.

*Primary Examiner* — Ian N Moore
*Assistant Examiner* — Latresa A McCallum
(74) *Attorney, Agent, or Firm* — Sage Patent Group

(57) ABSTRACT

A method for operating a network node in a millimeter network, mmW network is provided. Operations according to the method include receiving a data packet comprising header information, the header information indicating a source ID, a destination ID, 5 a flow ID and a UE ID; and transmitting, to the preceding network node, an ARQ response message indicating the flow ID and the UE ID and ACK/NACK pertaining to the received data packet. Related devices and methods are also provided.

2 Claims, 13 Drawing Sheets

(51) Int. Cl.
  *H04L 1/16*   (2006.01)
  *H04L 1/00*   (2006.01)
  *H04L 12/721*   (2013.01)
  *H04L 12/741*   (2013.01)
  *H04L 12/851*   (2013.01)

(52) U.S. Cl.
  CPC .......... *H04L 1/1822* (2013.01); *H04L 1/1896* (2013.01); *H04L 45/72* (2013.01); *H04L 45/745* (2013.01); *H04L 47/2483* (2013.01); *H04L 2001/0097* (2013.01)

(58) Field of Classification Search
  CPC ................ H04L 45/45; H04L 47/2483; H04L 2001/0097
  See application file for complete search history.

(56) References Cited

U.S. PATENT DOCUMENTS

| | | | |
|---|---|---|---|
| 8,885,600 B2 * | 11/2014 | Lee | H04W 36/02 370/331 |
| 8,897,223 B2 * | 11/2014 | Natarajan | H04B 7/15521 370/328 |
| 2009/0016257 A1 | 1/2009 | Visa et al. | |
| 2012/0170509 A1 | 7/2012 | Lee et al. | |
| 2013/0176939 A1 | 7/2013 | Trainin et al. | |
| 2014/0321282 A1 * | 10/2014 | Pragada | H04W 36/0072 370/235 |
| 2016/0007371 A1 | 1/2016 | Pietraski et al. | |
| 2018/0035373 A1 * | 2/2018 | Shin | H04W 4/80 |

\* cited by examiner

100 - network node
120 - control circuitry
122 - radio circuitry
124 - antenna circuitry

ENHANCEMENT OF RELAY ARQ IN MMW NETWORK

TECHNICAL FIELD

The present disclosure pertains to network technology, in particular mmW (millimeter Wave) networks.

BACKGROUND

The ultimate goal of mobile broadband should be the ubiquitous and sustainable provision of non-limiting data rates to everyone and everything at every time. Along this path, millimeter network (mmW) may be an important next step following the successful introduction of LTE (Long Term Evolution, a telecommunication standard of the 4$^{th}$ generation) for wide-area and local-area access. Even though only a local-area access technology, MMW can be deployed in areas with high traffic improving throughput. Through overprovision and the related low average loads in the access network, MMW could create ubiquitous access opportunities which—even under realistic assumption on user density and traffic—provide users with all desired data rates.

Overprovision can be achieved by an extremely dense grid of access nodes; inter-access-node distances in the order of tens of meters and below are envisioned, in indoor deployments one or even multiple access nodes are conceivable in each room. Additionally to increased network capacity, densification—via reduced transmit powers—also offers access to vast spectral ranges in the millimeter-wave bands and thus increased data rates.

For example, several GHz of spectrum is available in the unlimited 60 GHz band and potentially more in other millimeter-wave bands, for which multi-Gb/s transmissions are possible even with technologies providing moderate spectral efficiency. Schemes with moderate spectral efficiencies offer robustness and energy efficient data transmission. Furthermore, there are also implementation issues at higher millimeter-wave frequencies that make it very challenging to provide very high spectral efficiency (in b/s/Hz). In this sense, one can trade spectral efficiency for bandwidth. Generally, mmW technology comes with a set of issues which are not suitable to be solved with current LTE technology.

SUMMARY

It is an object of the present disclosure to provide approaches facilitating reliable transmission of data packets via a millimeter network, with a limited overhead.

Accordingly, there is disclosed a method for operating a network node in a millimeter network, mmW network. The method comprises receiving, e.g. from a preceding network node of the mmW network, a data packet comprising header information, the header information indicating a source ID, a destination ID, a flow ID and a UE ID. The method also comprises transmitting, to the preceding network node, an ARQ response message indicating the flow ID and the UE ID and ACK/NACK pertaining to the received data packet.

Moreover, there is disclosed a network node for a millimeter network, mmW network. The network node is adapted for receiving, e.g. from a preceding network node of the mmW network, a data packet comprising header information, the header information indicating a source ID, a destination ID, a flow ID and a UE ID; and for transmitting, to the preceding network node, an ARQ response message indicating the flow ID and the UE ID and ACK/NACK pertaining to the received data packet.

The network node may comprise a receiving module for this receiving and/or a transmitting module for this transmitting.

The preceding network node may be a source, in particular a source associated to a local ARQ process and/or the node transmitting the data packet to the network node.

The network node may be a destination node associated to a local ARQ process. Transmitting the ARQ response message may be part of an ARQ process, in particular a local ARQ process. The network node may be adapted for, and/or comprise a routing module for, and/or perform routing of the received data packet to another network node, e.g. a successor network node.

Additionally or alternatively, there is described a method for operating a serving network node in a millimeter network, mmW network. The method comprises receiving, e.g. from a user equipment, a data packet comprising header information, the header information indicating a source ID and a destination ID, wherein the source ID is a UE ID. The method also comprises transmitting, e.g. to a successor network node, based on the data packet, a data packet comprising header information indicating a source ID and a destination ID, wherein the source ID is a serving network node ID.

A serving network node for a millimeter network, mmW network, may be considered. The serving network node is adapted for receiving, e.g. from a user equipment, a data packet comprising header information, the header information indicating a source ID and a destination ID, wherein the source ID is a UE ID. The serving network node may also be adapted for transmitting, e.g. to a successor network node, based on the data packet, a data packet comprising header information indicating a source ID and a destination ID, wherein the source ID is a serving network node ID. The serving network node may comprise a corresponding receiving module and/or transmitting module.

The serving network node may be considered to be replacing the UE's with its own as source ID. It may be considered that a serving network node performs, and/or is adapted for performing and/or comprises a handover module for performing, handover. Performing handover may comprise routing one or more data packets to the target network node of the handover.

Generally, a network node may also be implemented to have or perform the functionality of a serving network node.

The serving network node ID may be an ID (e.g., level 2 ID or address) of the serving network node receiving the data packet. A successor network node may be a node intended or addressed as receiver of the data packet.

Transmitting based on a data packet may comprise transmitting a data packet having the same payload data and/or similar header information, in particular pertaining to an E2E ARQ process. Such transmitting may comprise amending or adapting the header information for a local ARQ process (between two neighboring nodes or a network node and its successor node).

An ARQ response message and/or an ARQ process may generally be a Relay ARQ process as described herein, and/or comprise and/or utilise one or more than one message formats as described herein, in particular formats as shown in and explained referring to FIGS. 7 to 9.

There is also disclosed a method for operating a terminating node in a millimeter network, mmW network, the method comprising transmitting, by the terminating node, an ARQ response message based on a received packet, the ARQ response message comprising header information indicating a source ID, a destination ID.

Furthermore, a terminating node for a millimeter network, mmW network is proposed. The terminating node is adapted for transmitting an ARQ response message based on a received packet, the ARQ response message comprising header information indicating a source ID, a destination ID and an ACK/NACK indication. The terminating node may comprise a corresponding transmitting module. It may be considered that the terminating node is a NC or LGW.

The ARQ response message may pertain to a local ARQ process.

Moreover, there is discussed a method for operating a terminal in a millimeter network, mmW network. The method comprises transmitting and/or receiving, e.g. by the terminal, a data packet comprising header information for an E2E ARQ process.

There may be considered a terminal for a millimeter network, mmW network. The terminal is adapted for transmitting and/or receiving a data packet comprising header information for an E2E ARQ process. The terminal may comprise a corresponding transmitting and/or receiving module.

The terminal may be adapted for, and/or comprise an ARQ module for, and/or perform an E2E ARQ process and/or a local ARQ process. The ARQ process/es may be transmitting ARQ process/es if the terminal is a source, and/or receiving ARQ process/es if the terminal is a destination. The terminal or ARQ module may generally be adapted for transmitting and/or receiving ARQ process/es.

In addition, there may be considered a computer program product comprising instructions causing control circuitry to perform and/or control any of the methods described herein, in particular when carried out by the control circuitry. The instructions may be executable by the control circuitry.

A memory storing a computer program product as described herein is also disclosed.

The approaches herein allow using local ARQ processes, e.g. in conjunction with an E2E ARQ process. This facilitates reliable communication via the mmW network.

BRIEF DESCRIPTION OF THE DRAWINGS

The drawings are provided to illustrate described contexts and approaches, and are not intended to limit the scope of the approaches described herein. The drawings comprise.

DETAILED DESCRIPTION

Figure 1:
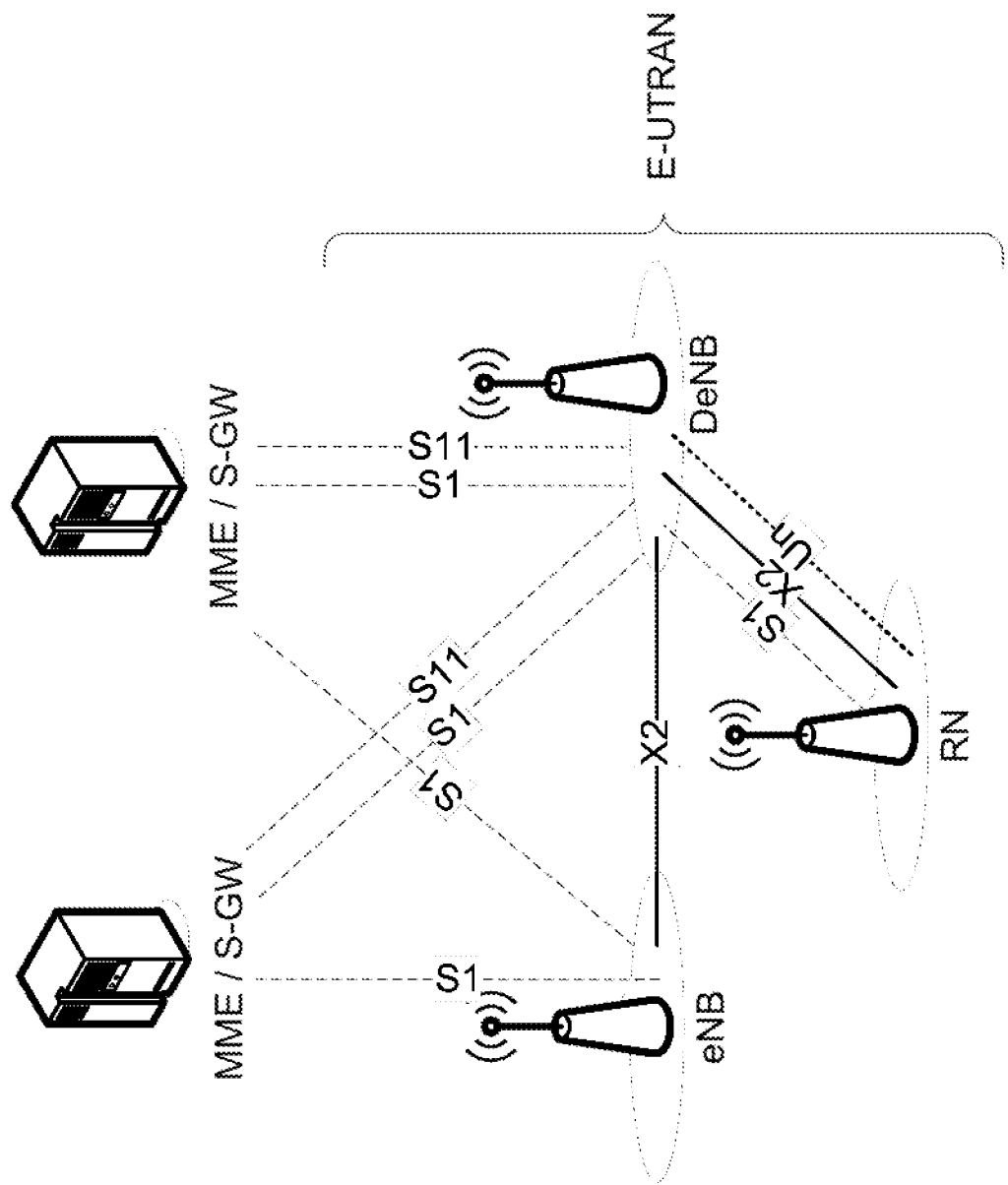
FIG. 1, showing a LTE Relay architecture.

Generally, there may be considered a network node adapted to carry out any of the method for operating a network node as described herein. Moreover, there may be considered a terminal adapted to carry out any of the methods for operating a terminal as described herein.

A network node may generally be any node of a wireless communication network, in particular of a millimeter network. A network node may in particular a wireless node, which may be adapted for communication utilising a millimeter wave air interface. A network node or wireless node may in particular be a AN or AGN. A network node may in particular be a node of a mmW network and/or RAN, e.g. AN or AGN or LGW or NC. It may be considered that one device comprises the functionality of several such nodes, e.g. a NC may provide the functionalituy of a LGW and/or AGN or AN. A serving network node may generally be a node serving, and/or adapted for or capable of, serving a terminal.

A data packet may be a unit of data, which may be formatted. Generally, data in a data packet may be transmitted together and/or along the same data path, e.g. via one or more network nodes. A data packet may comprise different types of data or information, e.g. payload like payload data or information, which may e.g. be user information or data (e.g., for user communication) and/or control information or data. Control information or data may pertain to controlling communication and/or a terminating node like a terminal and/or a network node. A data packet may additionally comprise a header or header information or data, which in particular may pertain to addressing the data packet and/or identifying the packet and/or the packet source and/or indicating the content or payload and/or one or more ARQ processes. A data packet may be referred to as message.

Generally, an ID may be an identification of a node, indicating the node and/or an address of the node. A network node, in particular an serving network node, and/or an AN or AGN may be adapted to access information pertaining to other nodes in the network, in particular addresses and/or IDs and/or location and/or whether the node is serving one or more terminals and/or which terminals are connected to the network and/or which are the neighboring nodes and/or the arrangement of the nodes of the network and/or transmission or reception characteristics of other nodes. Such information may be provided by the network, in particular a NC and/or LGW or another AN or AGN, e.g. when based on network setup and/or network configuration.

Generally, a network node may be adapted for, and/or comprise a corresponding routing module, and/or perform routing of a received data packet to another (receiving) network node, in the direction of a terminating node (destination) of the data packet, e.g. based on such information and/or header information of the packet. Routing may comprise transmitting the data packet to the receiving node, e.g. based on and/or after amending the header of the packet.

An ARQ process (also referred to as procedure) may be an Automatic Repeat Request, an error control and/or handling process or procedure.

An ARQ process for transmitting (also called transmitting ARQ process) may generally be an ARQ process in which a data packet or message is transmitted and/or stored at the performing node or module until an ARQ response message indicating ACK is received from the receiving node (destination) of the data packet. The ARQ process for transmitting may comprise deleting the data packet from memory based on a received corresponding ARQ response message indicating ACK, and/or retransmitting the data packet based on a received corresponding ARQ response message indicating NACK. Retransmitting may comprise retransmitting to the same node, or to a different node.

An ARQ process for receiving (also called receiving ARQ process) may generally be an ARQ process in which a data packet is received.

An ARQ process (for receiving) may comprise receiving a message and/or data packet (received message or received data packet). The ARQ process may comprise determining whether the received message has been correctly received, e.g. based on an error detection procedure, e.g. comprising error decoding and/or determining and/or comparing one or more checksums. Generally, an ARQ process (for receiving) may comprise transmitting an ARQ response message, which may be based on receiving a (received) message and/or determining whether the (received) message has been correctly received.

A successor network node may be a receiver of a transmitting ARQ process and/or the destination or target of a routing.

The ARQ process and/or ARQ response message may pertain to a single hop (respectively, one transmission step), and/or to a plurality of hops, in particular a transmission (of the received message) comprising a plurality of hops from one terminating node to another terminating node. An ARQ process pertaining to a single hop may be referred to as single hop ARQ process or local ARQ process. An ARQ process pertaining to a plurality of hops or an ARQ process terminated by terminating nodes and/or terminals may be considered an E2E (End2End) ARQ process.

An ARQ response message may generally indicate or comprise an ACK or NACK pertaining to the hop and/or hops it pertains to. An ACK may indicate correct reception of the (received) message (acknowledgement), a NACK may indicate incorrect reception of the (received) message (non-acknowledgement). The ARQ response message may be addressed to and/or intended for the source node of the (received) message (e.g., for a plurality of hops or an E2E ARQ process) and/or a preceding node (e.g., for a single hop or local ARQ process). A source node may be the recipient (addressee) of the ARQ response message, in particular a source node may be the recipient of a E2E ARQ response message and a preceding node may be a recipient of a single hop ARQ response message.

A terminating node may be a node intended for terminating a message transmission path (e.g., source node or destination node). A terminating node may in particular be a terminal or a network node like a LGW or NC. A terminating node may be the end node of an E2E ARQ process. Nodes involved in transmission (in particular, in transmissions utilising millimeter waves and/or a corresponding air interface) between terminating nodes may be considered intermediate nodes, which may be implemented as intermediate ANs or AGNs. An end node of an E2E ARQ process may be the node originating the data packet in the network (e.g., NC or LGW, or terminal), or the destination (e.g., terminal, or NC or LGW).

A source ID (Identification) may indicate an address or identity of a source (e.g., network node or terminating node or terminal) of a message or data packet. The source may in particular be the original source or originator of the message or associated payload, or a node representing a source for a transmission path, e.g. a network node like an AN or AGN.

A destination ID may generally indicate an address or identity of a destination (e.g., network node or terminating node or terminal) of a message or data packet.

A source ID and/or a destination ID may generally pertain to a random access network, in particular a millimeter network, and/or an addressing scheme pertaining to a level or layer of the network stack (e.g., according to a protocol layer model). A source and/or destination ID of a network node, e.g. an AN or serving AN, may in particular a layer 2 or level 2 address. A source ID of a terminal may be associated to layer 3 or level 3. To each level there may be associated a protocol for transmitting and/or receiving messages.

A source may generally be a node transmitting a message or data packet having an associated ARQ process. A destination may generally be a node (network node or terminal) receiving a message or data packet and transmitting a corresponding ARQ response message to the source. There may be different sources for local ARQ processes and E2E ARQ processes. In particular, there may be a plurality of sources (and destinations) for local ARQ processes involving intermediate nodes for a source and a destination for an E2E ARQ process.

A flow ID may indicate a message or data packet, or a series or flow of such messages or packets. It may be considered that a flow ID may be associated to a service and/or data stream and/or bearer, which may be transmitted via the network. A flow may have a source and/or destination, which may be associated corresponding IDs. To a source or destination (e.g., a terminating node or terminal) there may be associated a plurality of flows. A source may have associated to it flows with different destinations. It may be considered that a destination has associated to it different sources. A flow may be terminated at a source and a destination. To each flow, there may be associated an ARQ process. It may be considered that to the ARQ process there is associated an ARQ flow representing the flow of an ARQ response message, in particular pertaining to E2E ARQ. A flow may be transmitted utilising a plurality of hops.

A transmission path or path may generally comprise a plurality of hops, in particular between a source and a destination, which may be represented by terminating nodes (and/or a terminal and a terminating AGN or AN or LGW).

A serving AN may be a network node configured for communicating with a terminal and/or controlling communication with a terminal. A serving AN may provide a serving cell. It may be considered that a terminal may be handed over between a source AN and a target AN. Before the handover (HO), the source AN may be the serving AN, and after the HO the target AN may be the serving AN.

A terminal may be a wireless device adapted for communication utilising a millimeter wave and/or cellular or wireless communication, e.g. via a corresponding air interface. A terminal may be operable for communicating via and/or connecting to a millimeter network. The terminal may also be referred to as user equipment (UE). A terminal may in particular be a mobile device and/or a device like a smartphone or featurephone, computer device or handheld, and/or a MTC (Machine-Type-Communination) enabled device, e.g. a sensor and/or machinery.

A terminal or network node may generally comprise circuitry, e.g. control circuitry and/or radio circuitry and/or antenna circuitry, which may implement an air interface, in particular a millimeter-wave air interface. Control circuitry may generally comprise processing circuitry, e.g. one or more processors and/or controllers, e.g. microcontroller/s. It may be considered that control circuitry may comprise, and/or is connected or connectable to, memory circuitry, e.g. one or more memory devices. A memory device may comprise volatile and/or non-volatile memory, e.g. random access memory and/or read-only memory and/or flash memory and/or optical memory and/or magnetic memory, or generally any kind of memory readable by control circuitry and/or corresponding processing circuitry. Radio circuitry may generally comprise circuitry for transmitting and/or receiving wireless signals, e.g. one or more transceivers and/or receivers and/or transceivers. The radio circuitry may comprise detectors and/or amplifiers and/or samplers and/or filter/s and/or generally suitable circuitry or interfaces for handling signaling. Antenna circuitry may generally comprise one or more antenna elements and/or corresponding devices (e.g., pre-amplifiers and/or interfaces to radio circuitry). Control circuitry may generally be adapted and/or connected and/or connectable for controlling radio circuitry and/or antenna circuitry. Radio circuitry may be operably connected or connectable to antenna circuitry.

A millimeter network may be a radio access network (RAN), which may utilise millimeter waves. The millimeter network may be connected or connectable to a core network, which may connect a plurality of separate RANs. The millimeter network may comprise a plurality of network nodes, e.g. ANs and/or AGNs. A millimeter network and/or air interface may be operable at a transmission or reception frequency between 30 GHz and 300 GHz (a millimeter wave may have a corresponding frequency).

Storing data, e.g. a data packet and/or corresponding data like payload data, may comprise storing in a memory, e.g. of control circuitry. A stored data packet may be stored without header information and/or limited header information and/or different header information than the data was transmitted before. In particular, a stored data packet may be represented by its payload data being stored.

Uplink may generally denote the transmission direction away from a terminal and/or closer to the core network or a terminating node of the network like an AGN or LGW. Downlink may generally refer to the transmission direction to a terminal and/or away from the core network or terminating node like AGN or LGW.

A backhaul may generally refer to an uplink connection from a network node, e.g. an AN or AGN, in the direction to and/or to the core network. A backhaul may be operable to transmit data packets or messages.

A relay node may be an intermediate AN or a serving AN.

Performing a (transmitting and/or local) ARQ process may comprise prepending header information pertaining to a local ARQ process before information pertaining to an E2E ARQ process. Such header information may comprise a Source ID and/or Destination ID, e.g. the Destination ID of an AN, in particular a serving AN, or an NC or LGW. The performing may comprise deleting header information pertaining to a receiving ARQ process and/or replacing the header information pertaining to a transmitting ARQ process of a preceding node (corresponding to the header information of a local ARQ process of a received data packet) with the header information pertaining to the transmitting ARQ process.

In 3GPP LTE systems, eNBs usually have fixed backhaul to connect to an EPC (Evolved Packet Core, the LTE core network to which the RANs (Radio Access Networks) providing air interfaces are connected). From 3GPP release 10, a relay or relay node, a new type of eNB (evolved Node B, a base station for LTE, also referred to as eNodeB) is standardized. A relay does not have to have a fixed backhaul, instead it may use the LTE air interface as wireless backhaul to connect to the EPC. That is, the backhaul consists of one radio hop (one hop describing a (direct, without intermediary node) radio/air interface connection between a node, e.g. an access node or eNB or user equipment or terminal, and another node or the EPC or a node of, or connected to, the EPC). A network architecture with a relay is shown in FIG. 1.

From a UE (User Equipment) served by the RN (Relay Node) to DeNB (Donor eNB, an eNB connected to the RN via air interface, one hop, and providing data and/or control functionality for the RN), there are two radio hop. Reliability of communication is guaranteed via a two hop RLC protocol, i.e. RLC (Radio Layer Control) between DeNB and RN to ensure reliable transmission between DeNB and RN and another RLC between RN to UE to ensure reliable transmission between RN and UE. A MME represent a Mobility Management Entity, S-GW represent a Serving Gateway. Between the nodes there are shown specific interfaces for inter-node communication, e.g. S1, S11, Un or X2.

It should be noted that herein, certain architectures and nodes or entities may be implemented according to and/or with reference to LTE definitions. However, the approaches described herein are not limited to this specific standard. It may generally be considered that a core network is implemented according to LTE, but the RAN connected to it is a millimeter network as described herein.

Figure 2:
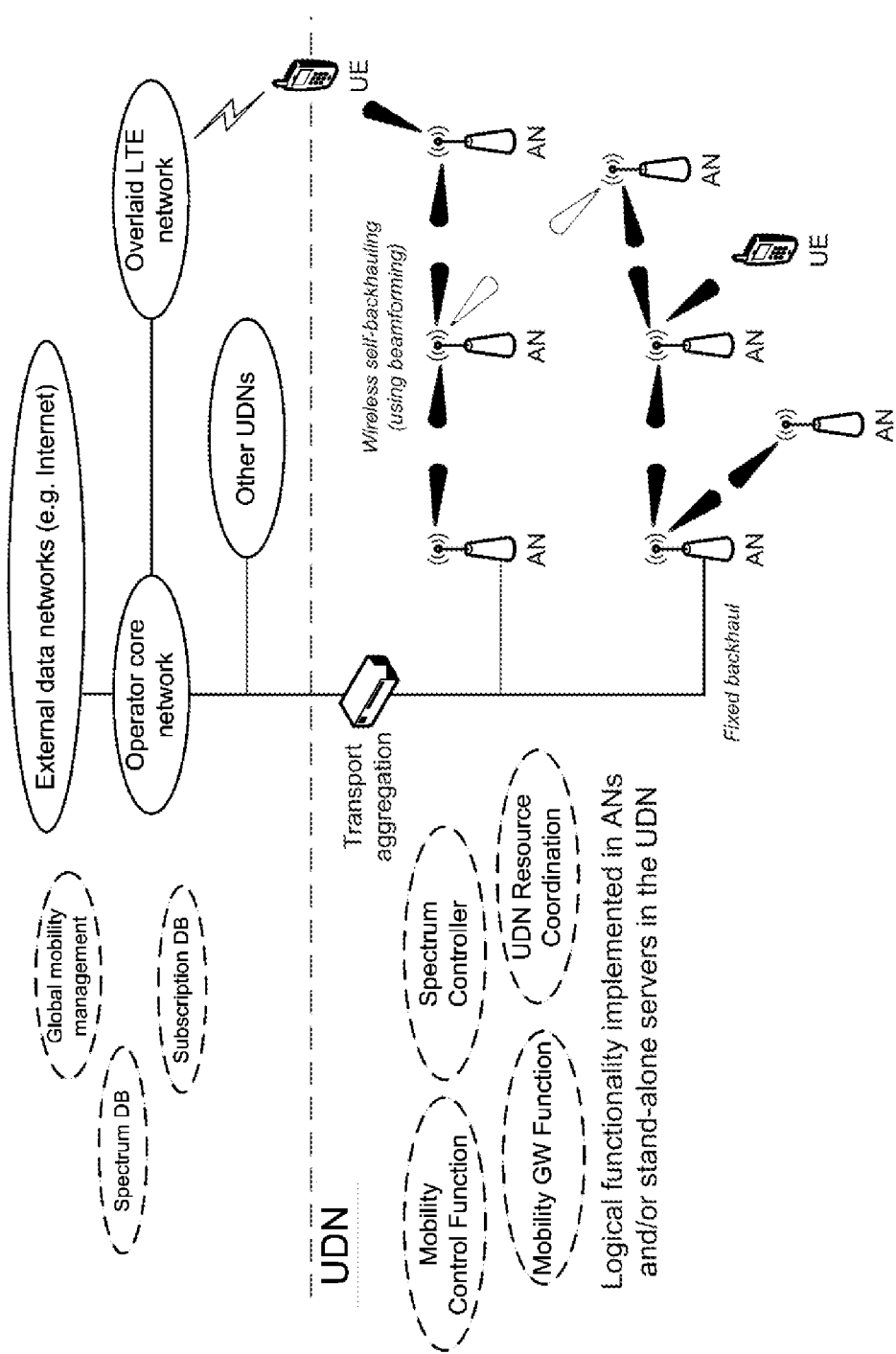
FIG. 2, showing an mmW architecture.

A network architecture for mmW is shown in FIG. 2.

Only very few Access Nodes (ANs) of the shown Ultra-Dense Network (UDN) have a fixed backhaul (a fixed backhaul may generally be a backhaul using a cable and/or fibre connection; a backhaul may be the connection to higher-levels of the network, e.g. to and/or in the direction to a core network like an EPC). Such an AN may also be referred to as AGN, Aggregation Node. Other ANs may need to use wireless backhaul to connect to the core network, e.g. via an AGN. Furthermore, to hop from an AN to an AGN, there may be required not just one hop, but several hops, depending on the AN distribution. Reliable transmission service needs to be provided by the mmW network. One solution is similar to LTE relay, i.e. RLC protocol is at each hop to provide end to end reliable transmission. So if a UE connect to a AN who need two hop wireless connection to AGN, then in total three independent RLC is needed from AGN to UE.

The issue with the hop by hop RLC solution is that, it does not provide an end to end reliable transmission service. This may be problematic in particular when a UE moves from one source AN to a target AN (e.g., performs handover), as then a UE would quite probably miss some packets which are transmitted by a source, e.g. source AN or terminatring node. In LTE, a source eNB (eNodeB, a network node of LTE) can forward unacknowledged packets to a target eNB to ensure packets are not lost. But in an mmW network, there may be no wireless connection between the source and target AN, such that packet forwarding may not be possible. And if an intermediate AN crashes, it is not possible to recover the packets stored in an intermediate AN using this hop by hop RLC protocol.

Figure 3:
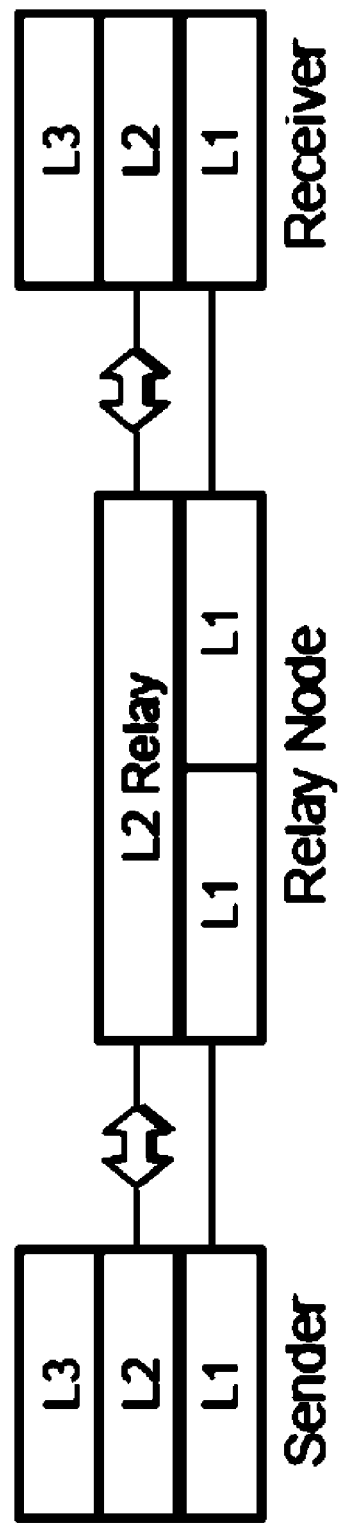
FIG. 3, showing an exemplary Relay ARQ setup.

A concept for an ARQ process (a Relay ARQ) (Automatic Repeat request, an error-control method or protocol) to overcome such issues is shown in FIG. 3. A sender (source) and a receiver (destination) may be addressable or addressed according to a level 3 protocol. A data packet may comprise corresponding source and destination ID and/or have an associated E2E ARQ process). A relay node (e.g., intermediate AN) may utilise a level 2 protocol for a local ARQ process and/or routing. As usual, a level 1 or layer 1 protocol representing a physical layer may be considered underlying the L2 and/or L3 protocols.

The concept is based on the idea that all nodes (e.g., a sender or source like a UE, or ANs or AGNs), which are involved in the (e.g., link layer) multi-hop transmission, understand the same ARQ protocol, which may represent a local ARQ process. The transmission in the chain of links is based on the same data units, including the use of the same sequence numbers. In particular, a data packet transmitted from node to node (per hop) may have the same sequence number and/or flow ID. In this way, it is possible to delegate the temporary retransmission responsibility from a sender or source node (e.g., a UE, or an AGN) step-wise from node to node until finally the data unit is received at the receiver or destination (e.g., AGN or UE) if per hop ACK is received by the respective previous nodes. However, the ultimate retransmission responsibility remains with the sender node (source). As long as end to end ACK is not received by the sender node (source), the packet is kept at sender. This has two positive consequences: First, retransmissions are in normal cases only performed at the link where the transmission error occurred. Second, the sender with its ultimate retransmission responsibility acts as an outer loop ARQ protocol as it provides a fallback state for error recovery.

There may be generally considered a data packet having header information pertaining to an E2E ARQ process (e.g., for an outer loop) and a local ARQ process. A node (terminal or AN, in particular) may be adapted for transmitting and/or receiving such a data packet, and/or comprise a corresponding data packet module. There may be different and/or subsequent local ARQ processes along a pathway of nodes. A network node or AN or AGN may be adapted for transmitting such data packets and/or to perform a local ARQ process for a received data packet and/or a local ARQ process for a data packet to be transmitted by the node. The data packet to be transmitted may be based on the data packet received (if the corresponding local ARQ process was successful). A network node like an AN may generally perform, and/or be adapted to perform and/or comprise one or more ARQ modules for performing, an ARQ process for transmitting and/or an ARQ process for receiving, which may be local ARQ process/es.

In mmW, multiple ANs connect with each other and form a wireless network, which may not necessarily represent a (straight) point to point chain. Each AN, when it receives a data packet, needs to decide to which node to forward this packet. A transmission path for a packet through an AN network may not easily be predictable; however, prescribing the path (e.g., by the sender and/or controlling node like an AGN) may involve undesirable signaling overhead. Furthermore, as multiple UE and multiple flows will be transmitted within an mmW network, when an AN receive an ACK (Acknowledgement, a signal indicating the correct transmission of a packet), it also need to know which packet this ACK corresponds to, otherwise there will be confusion. A network node and/or AN may generally perform, and/or be adapted for performing and/or comprise a routing module for performing, routing of a received data packet, e.g. based on received header information (in particular, destination ID), and/or information regarding the network. The node may obtain the information regarding the network form a memory and/or receive such from one or more network nodes, in particular a controlling node like a NC, e.g. when (re-)configuring and/or setting up the network.

Accordingly, there is disclosed an addressing/routing mechanism (e.g., a layer 2 (L2) mechanism). There is also disclosed a UE/flow identification mechanism. The mechanism may be integrated with and/or comprise an ARQ protocol like a Relay ARQ protocol.

With this L2 routing/addressing mechanism, each AN/AGN in mmW can be added into the Relay ARQ chain dynamically without explicit signaling. UE specific buffers at AN/AGN are created on the fly.

Packet and ACK (respectively NACK, a non-acknowledgement signal) of the Relay ARQ protocol are kept unique with the L2 addressing and UE ID and flow ID information. And each AN/AGN knows how to forward a Relay ARQ packet/ACK based on such information.

An intermediate AN/AGN could forget about a UE when it receives per hop ACK and has no outstanding packet for a specific UE. As an optimization, it is possible for an intermediate AN/AGN to store the packet until end to end ACK is received. This makes it possible to handle mobility "below" the intermediate AN/AGN. There is also proposed an enhancement of the Relay ARQ protocol for better application to a mmW, multihop network.

Different packet headers are designed for Relay ARQ protocol suitable for either end to end or per hop transmission.

The solution gets the benefits for Relay ARQ in that re-transmission in most cases happens on the link where the error occurred, without the risk of competing retransmissions on higher layers (which only need to be handled on Relay failure).

The solution supports routing with no explicit "path" signaling, which reduces latencies and overhead. Routing also has the advantage that different paths can be selected in UL/DL.

The solution enhances packet transmission during UE mobility procedure. Packets on the path can be re-routed or recovered by the intermediate node when necessary.

Figure 4:
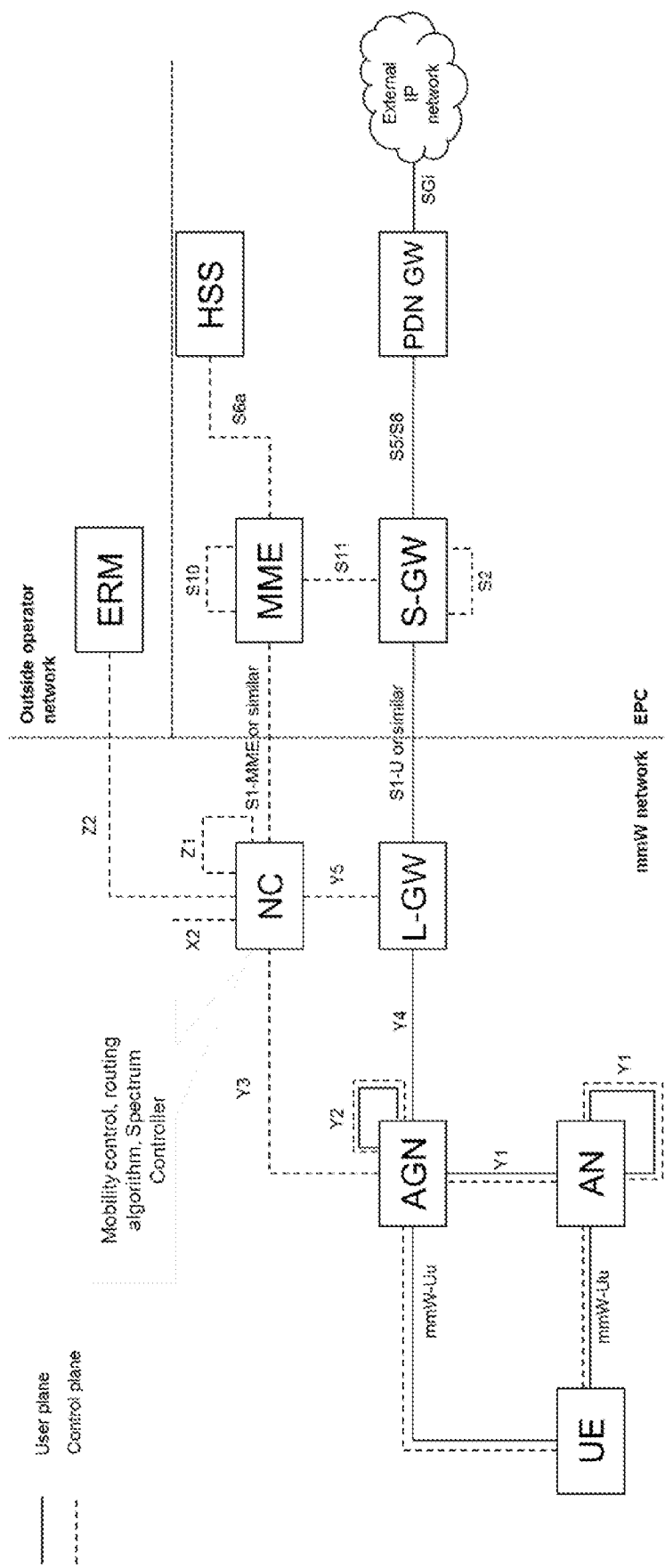
FIG. 4, showing an exemplary mmW architecture.

A corresponding mmW network architecture is shown in FIG. 4.

The vertical slashed line in FIG. 4 indicates the separation between a mmW Network (a RAN) and a LTE-based EPC, which comprises e.g. a Packet Data Network Gateway (PDN GW), Home Subscriber Server (HSS) and other entities like an Enterprise Resource Manager (ERM).

A NC (Network Controller) of the mmW network is a central control node, which is used to manage overall radio resource in mmW and which serves as the control plane anchor point for a UE to connect to a MME (Mobility Management Entity) in the core network. LGW (Local GateWay) is the user plane anchor point for a UE to connect to a SGW (Serving GateWay) of the core network. A E2E/local ARQ protocol like a Relay ARQ protocol operates between UE and NC or between UE and LGW, wherein intermediate AN/AGN may also be involved. Between the nodes in FIG. 4 there are indicate corresponding communication interfaces.

Figure 5:
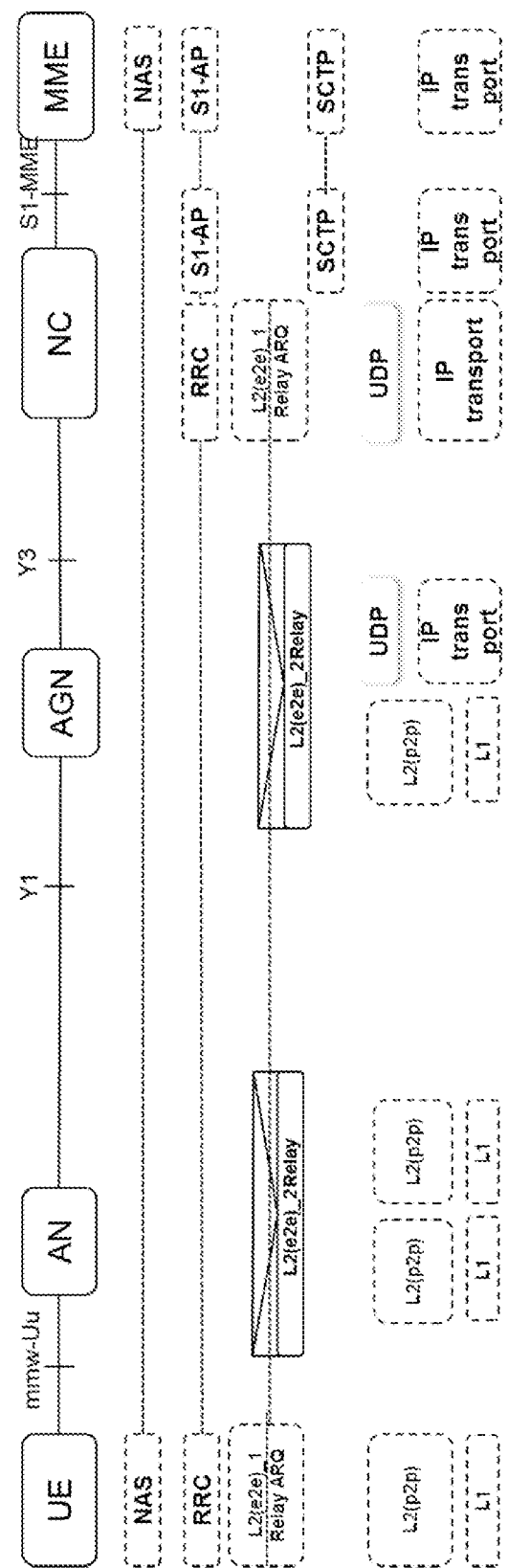
FIG. 5, showing an exemplary protocol stack between UE and NC.
Figure 6:
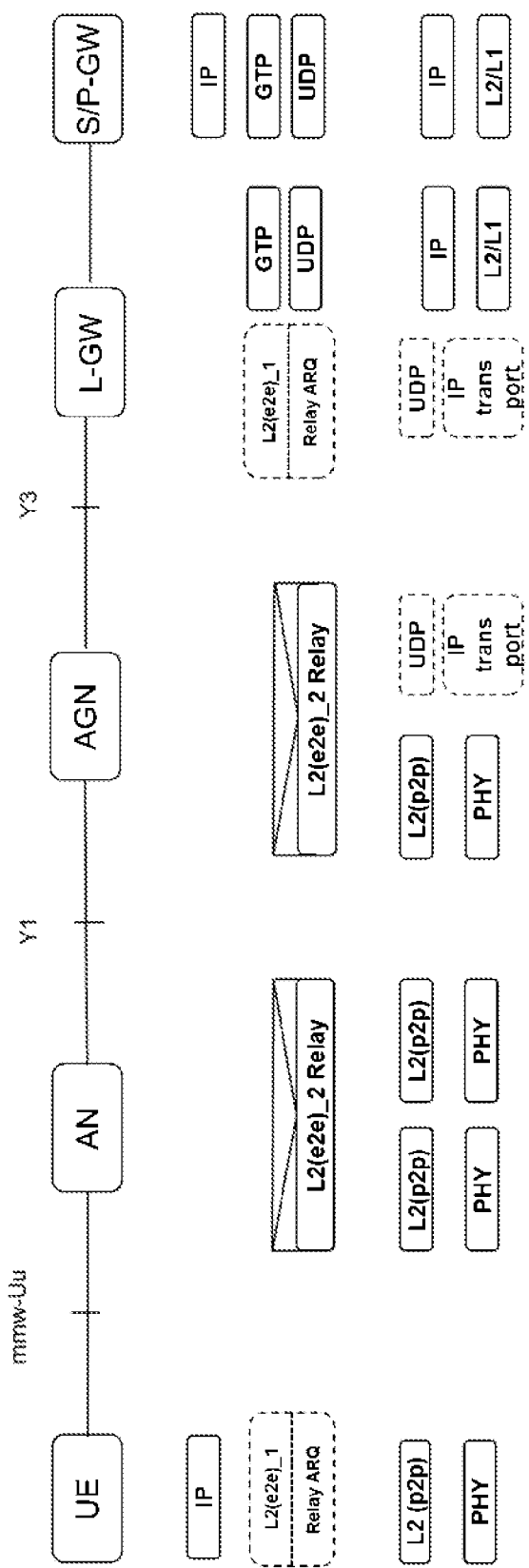
FIG. 6, showing an exemplary protocol stack between UE and LGW.

The protocol stack between UE and NC is shown in FIG. 5, wherein the well-known acronym RRC pertains to the Radio Resource Control, and UDP to User Datagram Protocol, IP to Internet Protocol, SCTP to Stream Control Transmission Protocol, NAS refers to the non-access stratum of the network. Interfaces like mmW-Uu between terminal and (serving) AN, Y1 between AN and AGN, and Y3 between AGN and NC are shown as well, in addition to inter-layer interfaces. The protocol stack between UE and LGW is shown in FIG. 6, with similar references, in addition to PHY indicating a physical layer and GDP indicating the GPRS Tunneling Protocol.

As the exemplary Relay ARQ protocol works at L2, in order for each node in mmW to know how to forward a packet, the addressing needed for Relay ARQ packet or its end to end ACK may be a L2 address.

Figure 7:
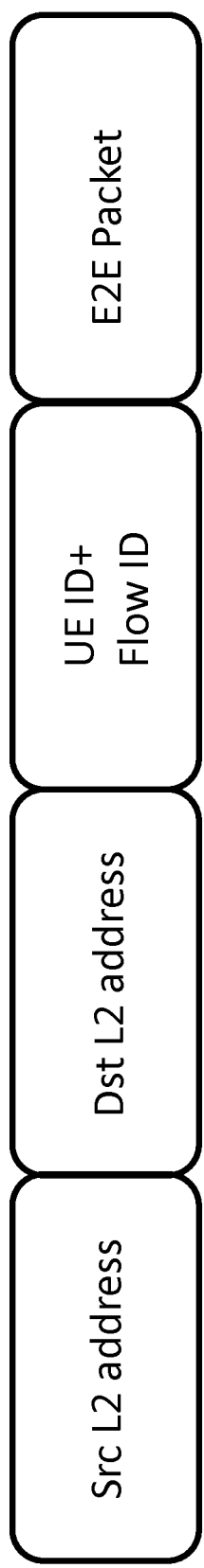
FIG. 7. showing an exemplary relay ARQ packet format.
Figure 8:
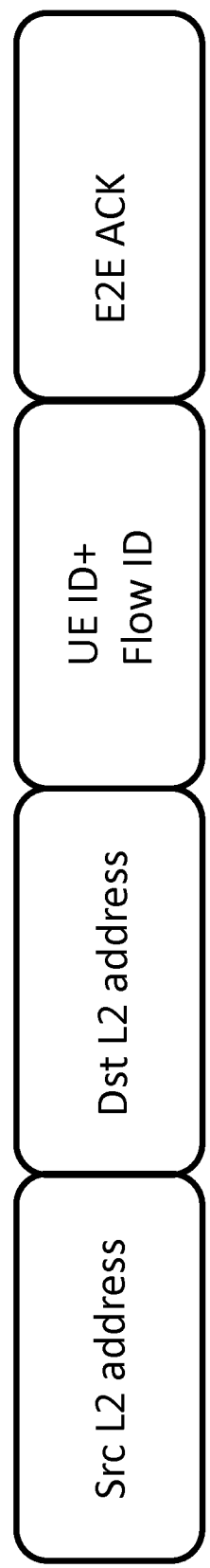
FIG. 8, showing an exemplary relay ARQ end to end ACK format.

In order to reduce signaling in mmW network, the L2 addresses of UE is not considered for routing, instead the L2 address used for routing are that of the fixed nodes in mmW, in particular AN and AGN, NC, LGW. So for example, if a packet should be routed to a specific UE, the LGW would send the packet to the L2 address of the AN, which is currently serving the UE. Furthermore, as Relay ARQ protocol is per flow based, the L2 address of fixed nodes cannot identify to which UE a flow is associated based on this L2 address alone. Thus, the UE ID and flow ID may also be provided. So the final packet format for Relay ARQ in a mmW network may be as shown in FIG. 7 or FIG. 8.

In the uplink, the source L2 address is the serving AN/AGN of the UE, the destination L2 address is the LGW or NC. In the downlink, the source L2 address is the address of NC or LGW, while the destination L2 address is the address of the AN or AGN serving the UE. The NC and/or LGW is aware of this address, as it is involved in and/or informed about radio resource distribution and UEs connected to the mmW, e.g. due to corresponding control signaling (e.g., a notification message) from the mmW network or corresponding nodes (AN/AGN).

A flow ID may be preconfigured and/or indicate at least one end point of the flow, e.g. NC and/or LGW. For example, a flow ID of 0 to 5 may indicate the communication with the NC, or flow ID N to 100 may indicate the communication with LGW, wherein N may e.g. be larger than 5, e.g. 10).

Figure 9:
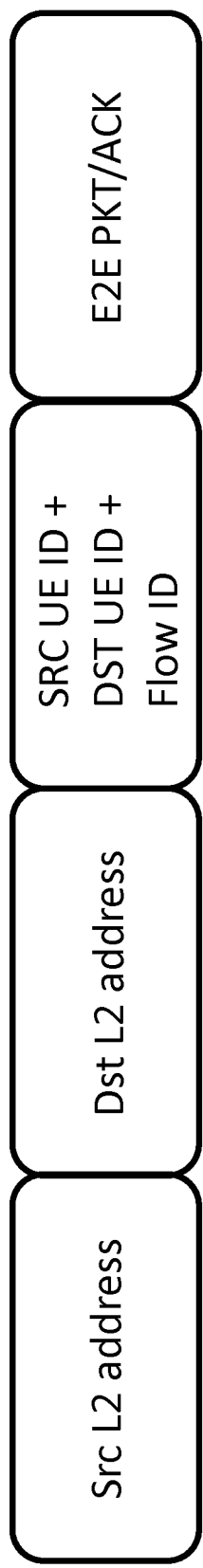
FIG. 9, showing an exemplary relay ARQ packet format for optimized communication between two UEs.

For optimized communication between two UEs within one mmW network, a packet format for Relay ARQ protocol may be as shown in FIG. 9. Accordingly, both the source UE ID and the destination UE ID may be included in the packet header.

In FIGS. 7 to 9, E2E packet or PKT refers to the payload of the packet, E2E ACK to the ACK/NACK indication, e.g. of an ARQ response message.

Figure 10:
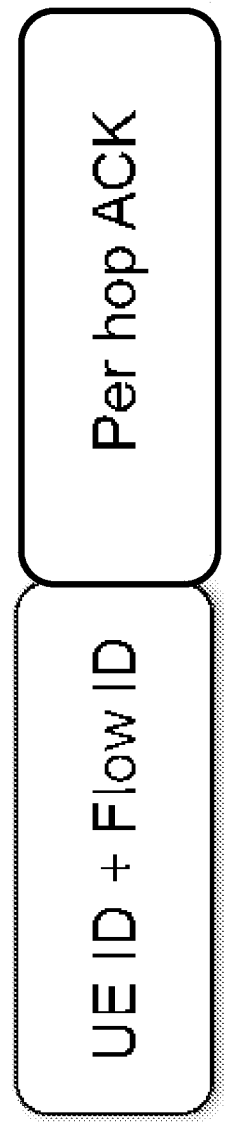
FIG. 10, showing an exemplary relay ARQ per hop ACK format.
Figure 11:
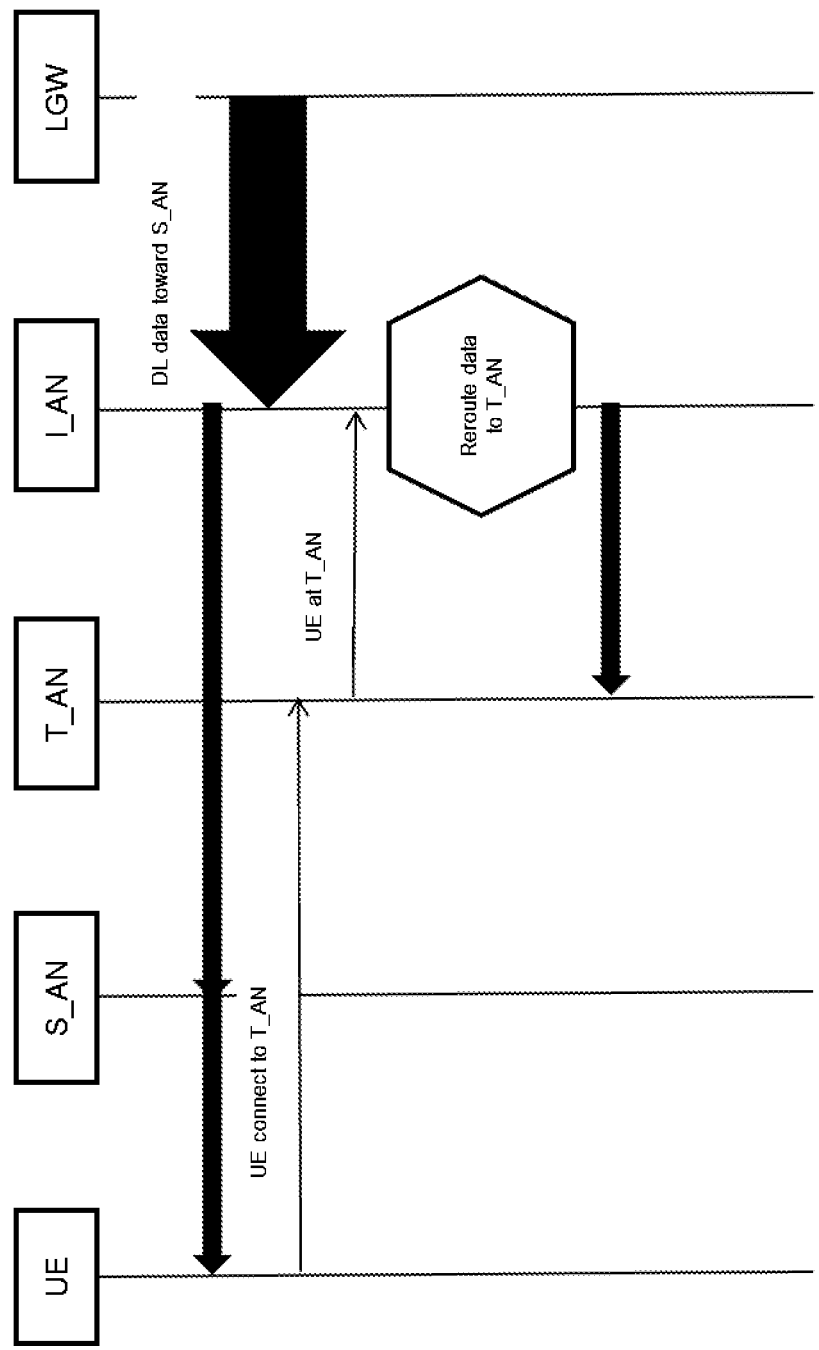
FIG. 11. showing relay ARQ Packet re-routing during UE mobility.

For per hop ACK in Relay ARQ protocol, as it is only between neighbor ANs (separated by one hop), the packet format for per hop ACK may be as shown in FIG. 10.

That is, the L2 source and destination address is removed as routing is not needed, but UE ID and Flow ID is still needed so that an intermediate AN know how to correlate this per hop ACK with the packet of one flow from one UE.

In order to differentiate these two types of header designed for Relay ARQ, for example the first bit of packet header can be used to indicate whether the packet header is with full address or just with UE and flow identify.

TABLE 1

Differentiation of packet header

| First bit of packet header | Meaning |
|---|---|
| 0 | Full L2 address plus UE and Flow ID |
| 1 | Only UE and Flow ID |

The whole procedure for Relay ARQ packet transmission may be implemented as described below.

In UL, when a UE sends a packet toward NC or LGW, the UE prepends its UE ID or L2 address and the flow ID before Relay ARQ payload. The packet is received by the AN serving the UE, which prepend its L2 address as source address and NC or LGW L2 address as destination address according to flow ID, just like that in FIG. 7. Then this packet can be routed toward LGW or NC according to L2 address. Each intermediate AN/AGN, when it receives the Relay ARQ packet, on one hand, it forwards the packet to LGW or NC according to the addressing, on the other hand, it sends back per hop ACK to the previous node. Therefore, the intermediate node checks the UE ID and the flow ID in the Relay ARQ packet header, and then sends per hop ACK back. This per hop ACK just as FIG. 10 shows. The previous node, when receiving this per hop ACK, correlates this ACK with the packet it sent out and can remove the packet from its buffer. When this node has no outstanding packet for a specific UE, it could forget about this UE. When NC or LGW receives the Relay ARQ packet, it can exchange the source and destination L2 address, keep the UE ID and Flow ID and send the end to end ACK back, just as FIG. 8 shows.

In the DL, when LGW or NC receives a packet which only contain a L3 IP address of UE, it first maps this L3 IP address of the UE to a L2 address of the AN which serves this UE. It then prepends the necessary packet header as shown in FIG. 7. Then this Relay ARQ packet can be routed toward the AN serving the UE, e.g. via one or more ANs/AGNs. When the serving AN of the UE receives the Relay ARQ packet, it can know which UE the packet to be sent according to UE ID in the packet header.

When a UE moves from one AN to another, some packets going from LGW to source AN could be lost as UE may already moved to target AN before receiving the packets from the source AN. This is not a problem in Relay ARQ protocol, as these packets are still kept at the LGW, so the LGW can retransmit them to UE via the target AN (which will be indicated to it as new serving AN after or while being handed over).

Additionally it may be considered that packets going in the path from LGW to source AN can be re-routed toward target AN with the designed packet header for Relay ARQ. The target AN could send a notification message toward LGW to indicate that UE has connected to the Target AN. This message may indicate the Target AN L2 address as well as the UE ID. An intermediate AN would then update the destination AN L2 address for that UE, e.g. based on the notification message, if it is hoped over it, and/or based on a corresponding message transmitted by the NC or LGW when receiving the notification message from the target (and new serving) AN. This would help to reroute those packets in the path from LGW to source AN toward the new path as soon as possible. Packet transmission delay may be reduced and some retransmission can be avoided.

It may be considered that at least one or some intermediate AN does not delete packets from its buffer even it receive per hop ACK from its next hop node. When a source AN or other intermediate AN detects that UE cannot be reached and needs to delete packets in its buffer, it sends a NACK indication toward LGW. The intermediate AN who still keeps those packets can then forward them to the UE via the new path immediately when receive such notification, such that the NACK indication may not even have to be transported to the LGW.

As an alternative to that the Target AN notifies the intermediate nodes, it is also possible that the source AN does this, by sending a Relay ARQ message towards the LGW which includes the UE identity and the Target AN identity, so that intermediate nodes can start forwarding packet along the new path.

Figure 12:
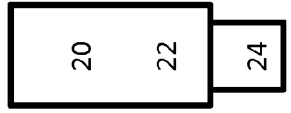
FIG. 12, showing an exemplary UE.

FIG. 12 schematically shows a terminal 10, which may be implemented in this example as a user equipment. Terminal 10 comprises control circuitry 20, which may comprise a controller connected to a memory. A receiving module and/or transmitting module and/or control or processing module and/or CIS receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for communicating with a millimeter network. The terminal 10 may be adapted to carry out any of the methods for operating a terminal disclosed herein; in particular, it may comprise corresponding circuitry, e.g. control circuitry. Modules of a terminal as described herein may be implemented in software and/or hardware and/or firmware in corresponding circuitry.

Figure 13:
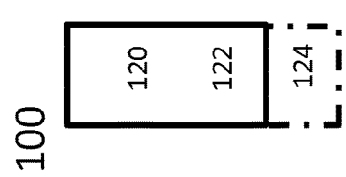
FIG. 13, showing an exemplary network node, e.g. an AN or AGN or LGW or NC.

FIG. 13 schematically show a network node (e.g. base station or AN or AGN or NC or LGW) 100. Network node 100 comprises control circuitry 120, which may comprise a controller connected to a memory. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules of a network node as described herein may be implemented in software and/or hardware and/or firmware in corresponding circuitry.

There is generally disclosed an addressing/routing mechanism designed for Relay ARQ protocol so that intermediate AN can join in the Relay ARQ chain dynamically without incurring significant signaling overhead. There is also disclosed an addressing mechanism suitable for both end to end ACK and per hop ACK for Relay ARQ protocol, as well as an optimized packet rerouting mechanism for Relay ARQ protocol when a UE moves from one AN to another.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a network node in a millimeter wave (mmW) network, the method comprising:
   receiving a relay automatic repeat request (ARQ) packet comprising header information from a user equipment (UE), the header information indicating a source L2 address, a destination L2 address, a flow ID and a UE ID, wherein the source L2 address pertains to a serving node and the destination L2 address pertains to a destination node;
   forwarding the ARQ packet to the destination node according to the destination L2 address in the header information; and
   transmitting, to a preceding network node, an automatic repeat request (ARQ) response message indicating a one hop acknowledgement or non-acknowledgement (ACK/NACK) pertaining to the received relay ARQ packet, wherein the ARQ response message comprises the flow ID and the UE ID and wherein the source L2 address and the destination L2 address are removed from the ARQ response message.

2. A network node configured for operation in a millimeter wave (mmW) network, the network node comprising:
   a processor being adapted to:
   receive a relay automatic repeat request (ARQ) packet comprising header information from a user equipment (UE), the header information indicating source L2 address, a destination L2 address, a flow ID and a UE ID, wherein the source L2 address pertains to a serving node and the destination L2 address pertains to a destination node;
   forward the ARQ packet to the destination node according to the destination L2 address in the header information; and
   transmit to a preceding network node, an automatic repeat request (ARQ) response message indicating a one hop acknowledgement or non-acknowledgement (ACK/NACK), wherein the ARQ response message comprises the flow ID and the UE ID and wherein the source L2 address and the destination L2 address are removed from the ARQ response message.

* * * * *